(12) United States Patent
Terazono et al.

(10) Patent No.: US 8,040,335 B2
(45) Date of Patent: Oct. 18, 2011

(54) SYSTEM, METHOD OF CONTROLLING SYSTEM AND APPARATUS

(75) Inventors: Kohei Terazono, Kawasaki (JP); Satoshi Iwata, Kawasaki (JP); Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 859 days.

(21) Appl. No.: 12/028,388

(22) Filed: Feb. 8, 2008

(65) Prior Publication Data

US 2008/0192033 A1 Aug. 14, 2008

(30) Foreign Application Priority Data

Feb. 14, 2007 (JP) ................. 2007-033612

(51) Int. Cl.
*G09G 5/00* (2006.01)

(52) U.S. Cl. ....................................... 345/204

(58) Field of Classification Search .......... 345/201–211, 345/690
See application file for complete search history.

(56) References Cited

U.S. PATENT DOCUMENTS

| | | |
|---|---|---|
| 2001/0009417 A1 | 7/2001 | Asai et al. |
| 2002/0000984 A1* | 1/2002 | Asai et al. .................. 345/211 |
| 2003/0137521 A1 | 7/2003 | Zehner et al. |
| 2004/0160409 A1 | 8/2004 | Kojima et al. |
| 2005/0088384 A1 | 4/2005 | Kayada et al. |
| 2006/0158335 A1 | 7/2006 | Jung et al. |

FOREIGN PATENT DOCUMENTS

JP 2005-208344 A 8/2005

OTHER PUBLICATIONS

European Search report dated Jul. 1, 2009, issued in corresponding European Patent Application No. 08100079.6.

* cited by examiner

*Primary Examiner* — Richard Hjerpe
*Assistant Examiner* — Carolyn R Edwards
(74) *Attorney, Agent, or Firm* — Westerman, Hattori, Daniels & Adrian, LLP

(57) ABSTRACT

According to an aspect of an embodiment, a system comprises a display having a display area for displaying an image corresponding to image data signals applied thereto, the display being capable of maintaining the image to be displayed after termination of application of the image data signals, an area designation unit for designating a part of the display area and a controller unit for receiving image data and generating image data signals to be applied to the display, the controller unit being configured to inhibit application of image data signals to the part of the display area when designated while applying new image data signals to the display.

6 Claims, 10 Drawing Sheets

Fig. 3

```
<protect>
  Rectangle of coordinate(100,100)-coordinate(300,200)
</protect>
<count>
  20
</count>
<code>
  123456
</code>
<area>
  Quadrangle of coordinate(0,0)-coordinate(1200,1200)
</area>
<image>
  Bitmap format data
</image>
```

Fig. 6

The area information table

| Area number | Protection area | Start count | Protection frequency | Cancellation code |
|---|---|---|---|---|
| 1 | Rectangle of coordinate(100,100)-coordinate(300,200) | 20 | 100 | 123456 |
| 2 | Quadrangle of coordinate(0,0)-coordinate(1200,1200) | 40 | 30 | abcde |
| 3 | Triangle of coordinate(0,0)-coordinate(0,50)-coordinate(50,0) | 60 | 30 | 123abc |
| | | | | |
| | | | | |

SYSTEM, METHOD OF CONTROLLING SYSTEM AND APPARATUS

BACKGROUND OF THE INVENTION

1. Field of the Invention

The present invention relates to an electronic paper device including a display panel that changes the display of an image for each pixel in accordance with application of a voltage.

2. Description of the Related Art

A related art example is Japanese Unexamined Patent Application Publication No. 2005-208344.

SUMMARY

According to an aspect of an embodiment, a system comprises a display having a display area for displaying an image corresponding to image data signals applied thereto, the display being capable of maintaining the image to be displayed after termination of application of the image data signals, an area designation unit for designating a part of the display area and a controller unit for receiving image data and generating image data signals to be applied to the display, the controller unit being configured to inhibit application of image data signals to the part of the display area when designated while applying new image data signals to the display.

BRIEF DESCRIPTION OF THE DRAWINGS

FIG. 3 is a conceptual diagram showing a specific example of image data;

FIG. 6 is a block diagram schematically showing a configuration of an area information table in a non-volatile memory;

DESCRIPTION OF THE PREFERRED EMBODIMENT

Electronic paper devices are widely known. For example, electronic paper devices use a cholesteric liquid crystal display panel. A cholesteric liquid crystal display panel is driven by a passive matrix system. In such a cholesteric liquid crystal display panel, a voltage is applied to each pixel on the basis of received image data, and the entire display on the display screen is changed all at once.

New image data is provided from an external data generation device to the electronic paper device. The electronic paper device shows a new image on its screen on the basis of the new image data. At that time, the previous image is forcefully changed, whereby the previous image data that has existed until the change is completely lost. Thus, there has been sought a technology that controls the change of the previous image in the electronic paper device although the new image data attempts to force such a change.

For example, the display on the display screen of the electronic paper device is partially changed. At that time, the corresponding image data must be stored for each pixel in a memory. As a result, the memory must have a relatively large capacity.

An embodiment will now be described with reference to the accompanying drawings.

Figure 1:
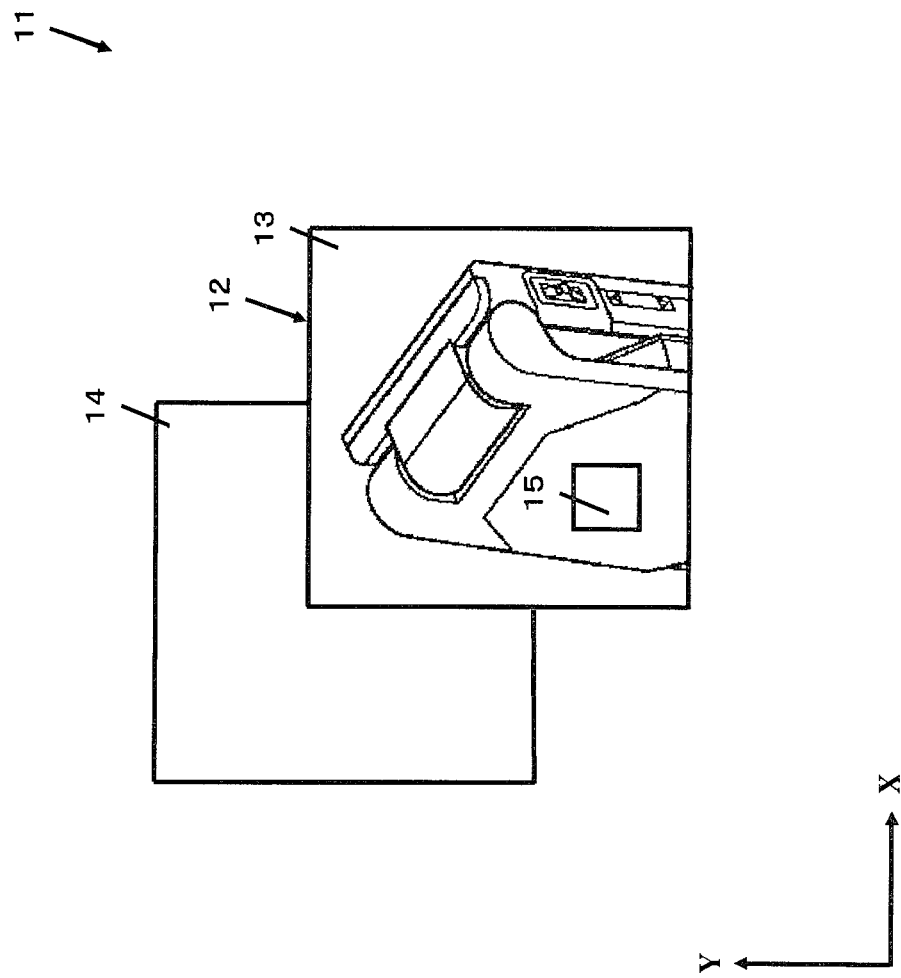
FIG. 1 is a conceptual drawing schematically showing an electronic paper control system according to an embodiment.

FIG. 1 shows an electronic paper control system 11 according to this embodiment. The electronic paper control system 11 includes an electronic paper device 12. The electronic paper device 12 shows an image on the display screen of an electronic paper 13. For example, the electronic paper 13 uses cholesteric liquid crystal. The electronic paper 13 as described above is driven by a so-called passive matrix system. While the display on the screen of the electronic paper 13 is changed in accordance with application of voltages, the display is maintained even if such voltage application is discontinued. Such voltages are provided to the electronic paper 13 on a pixel by pixel basis. Each pixel of the electronic paper 13 reproduces a color in accordance with the magnitude of the applied voltage. Even after the voltages have been discontinued, each pixel continues to reproduce the color. Here, a pixel in the display screen may be specified, for example, using the x and y coordinate values of an x-y coordinate system. A display device has a display area for displaying an image corresponding to image data signals applied thereto. The display device is capable of maintaining the image to be displayed after termination of application of the image data signals.

When the electronic paper control system 11 changes the image, it uses a data generation device 14. Specifically, new image data is transmitted from the data generation device 14 to the electronic paper device 12. Then the electronic paper 13 shows another image on its screen on the basis of the transmitted image data. Since a protection area 15 is set up in a specific area on the display screen of the electronic paper device 12, the display until then is maintained in the protection area 15, although the new image data has been provided. The protection area 15 will be described in detail later.

Figure 2:
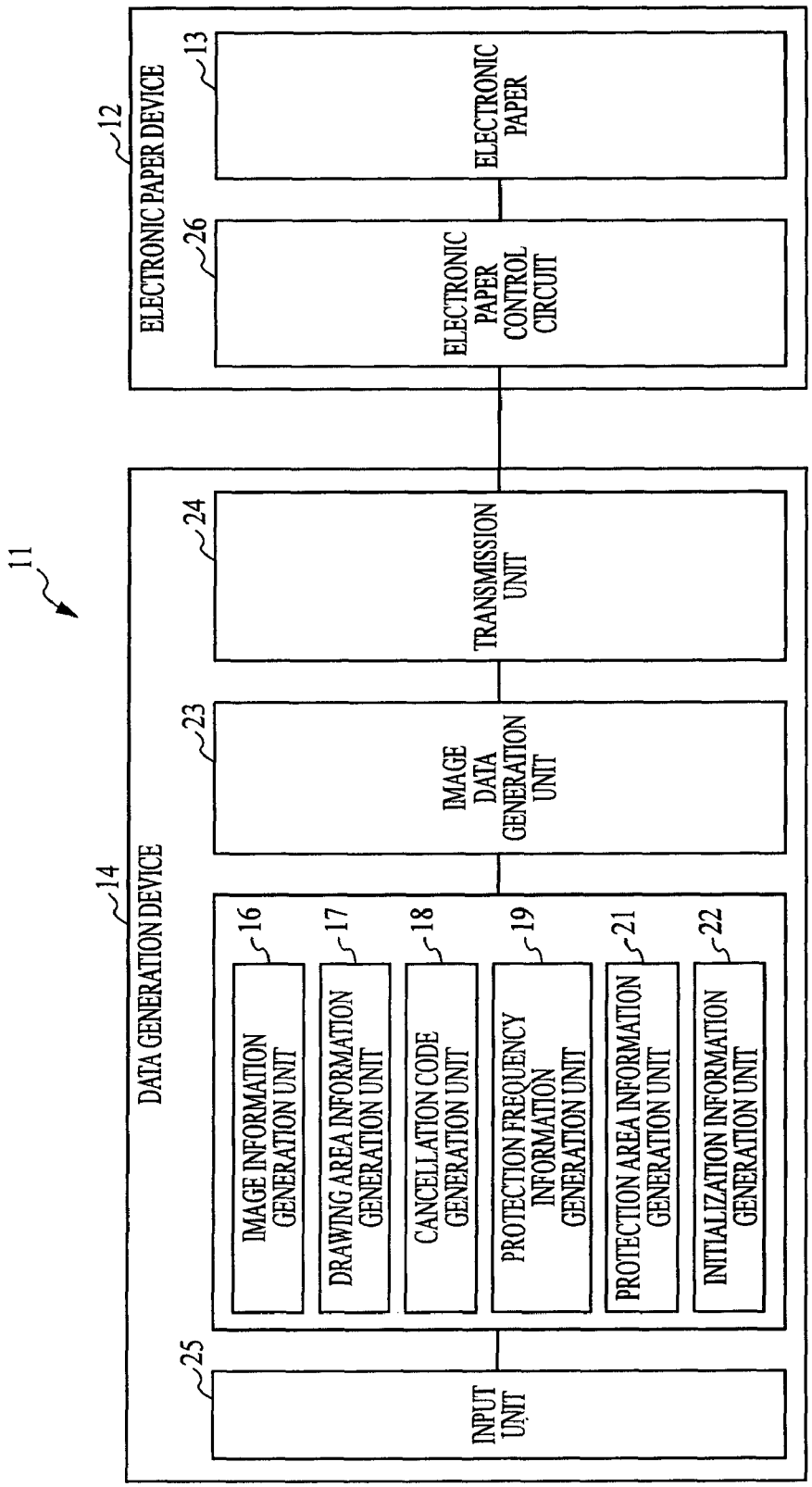
FIG. 2 is a block diagram schematically showing a configuration of a data generation device in the electronic paper control system.

As shown in FIG. 2, the data generation device 14 includes an image information generation unit 16 that generates image information. An image is specified on the basis of such image information. For example, bit map format data may be used as such image information.

The data generation device 14 includes a drawing area information generation unit 17 that generates drawing area information. Such a drawing area information is used to specify an area for displaying an image specified on the basis of image information. For example, the x-y coordinate system set up on the display screen may be used to specify such a drawing area. For example, in FIG. 1, the display screen includes 1200×1200 pixels. Accordingly, the maximum range of the drawing area is set to (1200, 1200).

The data generation device 14 also includes a cancellation code generation unit 18, a protection frequency information generation unit 19, and a protection area information generation unit 21. The protection area information generation unit 21 generates protection area information. Or an area designation unit designates a part of the display area. Such protection area information is used to specify the range of the protection area 15. For example, the x-y coordinate system set up in the display screen may be used to specify the protection area 15. For example, in FIG. 1, the protection area 15 is specified as a "rectangle specified by (coordinates (100, 100)—coordinates (300, 200).

The cancellation code generation unit 18 generates a predetermined cancellation code, that is, a cancellation identifier. For example, such a cancellation code may be represented by characters and/or numerics. The cancellation code is used to cancel the protection area 15 described above. The cancellation code will be detailed later. The protection frequency information generation unit 19 generates protection frequency information. For example, such protection frequency information may be represented by numerics. The protection frequency information is used to cancel the protection area 15. The protection frequency information will be detailed later.

The data generation device 14 further includes an initialization information generation unit 22 that generates predetermined initialization information. For example, such initialization information may be represented by a specific identifier. The initialization information is used to cancel the protection area 15. The initialization information will be detailed later. As mentioned above, the area designation unit provides information for resetting the part of the display area.

An image data generation unit 23 generates image data on the basis of outputs of the image information generation unit 16, the drawing area information generation unit 17, the cancellation code generation unit 18, the protection frequency information generation unit 19, the protection area information generation unit 21, and the initialization information generation unit 22. The generated image data is transmitted from a transmission unit 24. An input unit 25 is coupled to each of the image information generation unit 16, the drawing area information generation unit 17, the cancellation code generation unit 18, the protection frequency information generation unit 19, the protection area information generation unit 21, and the initialization information generation unit 22. The input unit 25 is used when the latter components generate image information, drawing area information, a cancellation code, protection frequency information, protection area information, and initialization information, respectively. The input unit 25 may be a keyboard, a numeric keypad, a mouse, a touch panel, or other input devices.

Figure 4:
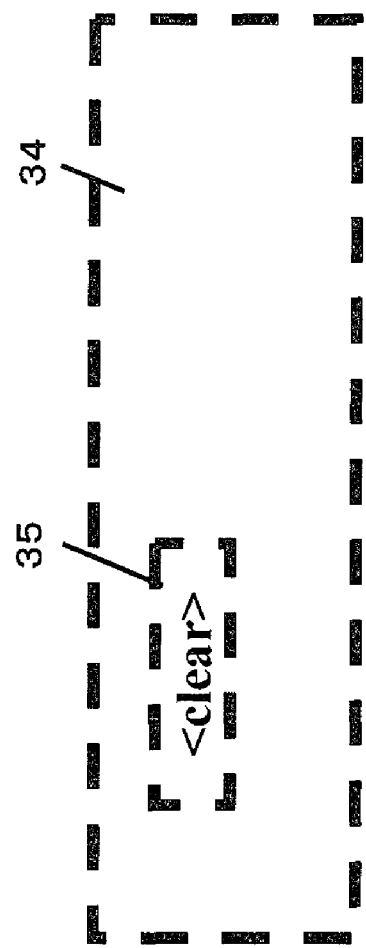
FIG. 4 is a conceptual diagram showing another specific example of image data.

The electronic paper device 12 includes an electronic paper control circuit 26. The electronic paper control circuit 26 controls the display on the display screen of the electronic paper 13. To perform such control, the electronic paper control circuit 26 acquires image data from the transmission unit 24 of the data generation device 14. Such image data may be described, for example, using the extensible Markup Language (XML). For example, FIG. 3 shows a specific example of such image data. Image data 27 includes protection area information 28, protection frequency information 29, cancellation code 31, drawing area information 32, and image information 33. To specify the protection area information 28, a <protect> tag and a </protect> tag are used. To specify the protection frequency information 29, a <count> tag and a </count> tag are used. To specify the cancellation code 31, a <code> tag and a </code> tag are used. To specify the drawing area information 32, an <area> tag and an </area> tag are used. To specify the image information 33, an <image> tag and an </image> tag are used. For example, FIG. 4 shows image data 34 according to another specific example. The image data 34 includes an identifier 35 of initialization information. Here, a <clear> tag is used as the identifier 35 of the initialization information. As for image data, any character string and/or numeric may be used as a tag in as much as it is described using XML. Further, image data may be described using a language other than XML.

Figure 5:
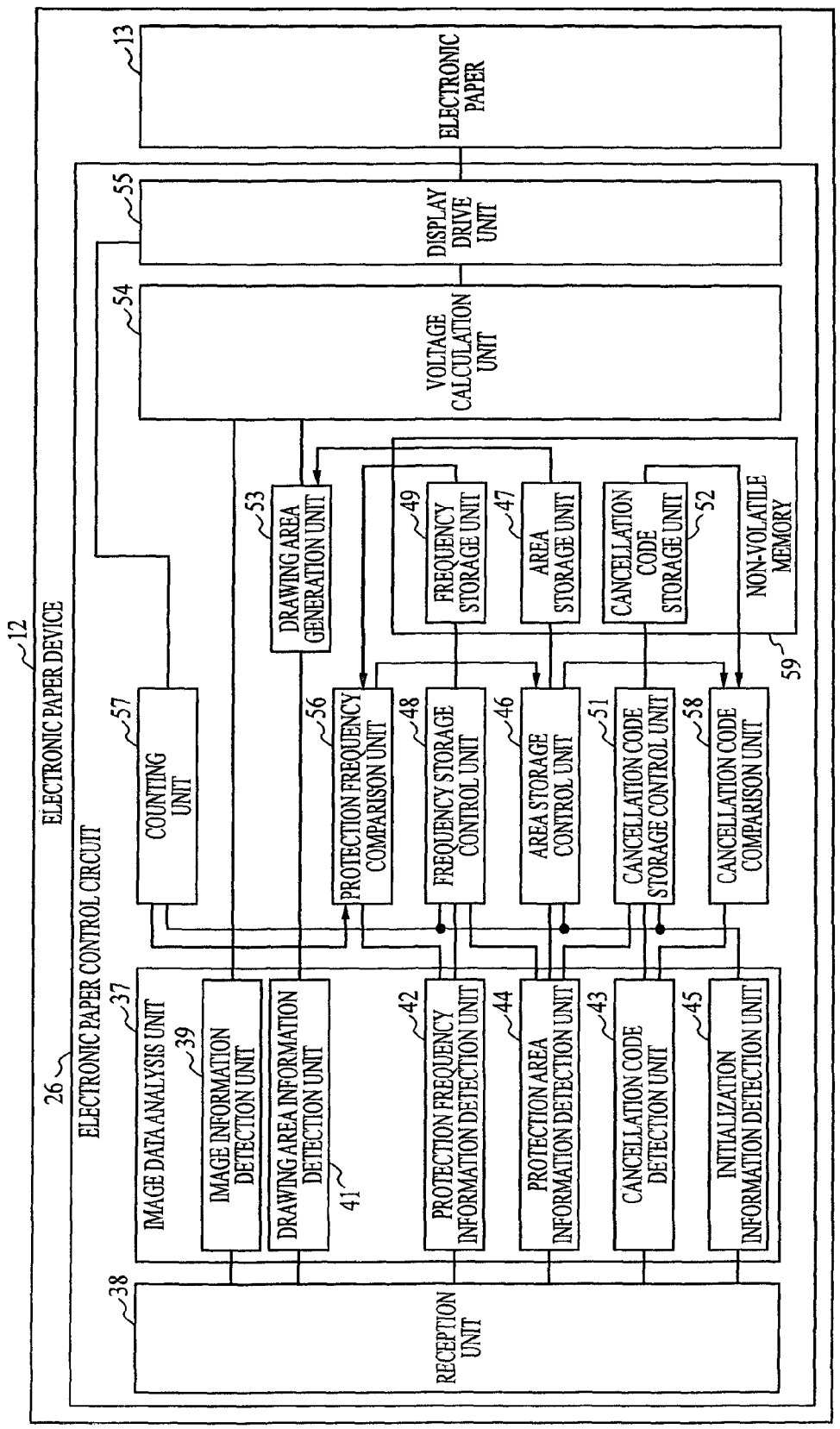
FIG. 5 is a block diagram schematically showing a configuration of an electronic paper control circuit.

As shown in FIG. 5, the electronic paper control circuit 26 includes an image data analysis unit 37. Image data is developed in the image data analysis unit 37 so that individual pieces of data are extracted from the image data. Coupled to the image data analysis unit 37 is a reception unit 38. The reception unit 38 acquires image data from the transmission unit 24 of the data generation device 14. The reception unit 38 may receive such image data by wire or wirelessly. The reception unit 38 is forced to receive such image data transmitted from the transmission unit 24. Such image data is transmitted from the reception unit 38 to the image data analysis unit 37.

The image data analysis unit 37 includes an image information detection unit 39, a drawing area information detection unit 41, a protection frequency information detection unit 42, a cancellation code detection unit 43, a protection area information detection unit 44, and an initialization information detection unit 45. The image information detection unit 39 extracts image information from the image data. The drawing area information detection unit 41 extracts drawing area information from the image data. The protection frequency information detection unit 42 extracts protection frequency information from the image data. The cancellation code detection unit 43 extracts a cancellation code from the image data. The protection area information detection unit 44 extracts protection area information from the image data. The initialization information detection unit 45 extracts initialization information from the image data.

Coupled to the protection area information detection unit 44 is an area storage control unit 46. Coupled to the area storage control unit 46 is an area storage unit 47. The area storage control unit 46 stores the protection area information in the area storage unit 47. Coupled to the protection frequency information detection unit 42 is a frequency storage control unit 48. Coupled to the frequency storage control unit 48 is a frequency storage unit 49. The frequency storage control unit 48 stores the protection frequency information in the frequency storage unit 49. In doing so, the frequency storage control unit 48 refers to the protection area information that is provided by the protection area information detection unit 44. Coupled to the cancellation code detection unit 43 is a cancellation code storage control unit 51. Coupled to the cancellation code storage control unit 51 is a cancellation code storage unit 52. The cancellation code storage control unit 51 stores the cancellation code in the cancellation code storage unit 52. In doing so, the cancellation code storage control unit 51 refers to the protection area information that is provided by the protection area information detection unit 44.

Coupled to the drawing area information detection unit 41 is a drawing area generation unit 53. The drawing area generation unit 53 sets up a drawing area on the display screen on the basis of the drawing area information. In doing so, the drawing area generation unit 53 refers to the protection area information stored in the area storage unit 47. The drawing area generation unit 53 subtracts an area specified by the protection area information stored in the area storage unit 47, from an area on the display screen specified by the drawing area information. Thus, a drawing area is determined.

Coupled to the image information detection unit 39 is a voltage calculation unit 54. The voltage calculation unit 54 calculates a voltage for each pixel of the electronic paper 13 on the basis of the image information. In doing so, the voltage calculation unit 54 refers to the drawing area determined by the drawing area generation unit 53. Thus, a voltage is calculated for each pixel included in the drawing area by the voltage calculation unit 54. Coupled to the voltage calculation unit 54 is a display drive unit 55. The display drive unit 55 applies voltages to the pixels of the electronic paper 13 in accordance with the voltages calculated by the voltage calculation unit 54. As explained above, a controller unit receives image data and generates image data signals to be applied to the display, the controller unit being configured to inhibit application of image data signals to the part of the display area when designated while updating new image data signals to the display.

The electronic paper control circuit 26 further includes a protection frequency comparison unit 56. Coupled to the protection frequency comparison unit 56 are the frequency storage unit 49 and a counting unit 57. The protection frequency comparison unit 56 compares a protection frequency, that is, a reception frequency stored in the frequency storage unit 49, with a reception frequency counted by the counting unit 57. The counting unit 57 counts the frequency of the change of the displayed image according to an operation of the display drive unit 55. If the reception frequency counted by the counting unit 57 exceeds the reception frequency stored in the frequency storage unit 49, the protection frequency comparison unit 56 provides a predetermined notification signal to the area storage control unit 46. Upon receipt of such a notification signal, the area storage control unit 46 deletes the protection area information in the area storage unit 47. As mentioned above, the controller unit reset the part of the display area on the basis of the frequency of receiving image data.

The electronic paper control unit 26 further includes a cancellation code comparison unit 58. Coupled to the cancellation code comparison unit 58 are a cancellation storage unit 52 and the cancellation code detection unit 43. The cancellation code comparison unit 58 compares the cancellation code stored in the cancellation code storage unit 52, with a cancellation code included in the image data. If the two cancellation codes are matched, the cancellation code comparison unit 58 provides a predetermined notification signal to the area storage control unit 46. Upon receipt of such a notification signal, the area storage control unit 46 deletes the protection area information in the area storage unit 47. As mentioned above, the controller unit reset the part of the display area upon receiving the information for resetting the part of the display area.

Here, the above-mentioned area storage unit 47, frequency storage unit 49, and cancellation code storage unit 52 may be constructed in one non-volatile memory 59. In this case, for example, an area information table 61 may be set up in the non-volatile memory 59 as shown in FIG. 6. The area information table 61 includes "area number" data 62, "protection area" data 63, "start count" data 64, "protection frequency" data 65, and "cancellation code" data 66 for each data set. The storage area of the "protection area" data 63 corresponds to the area storage unit 47. That of the "protection frequency" data 65 corresponds to the frequency storage unit 49. That of the "cancellation code" data 66 corresponds to the cancellation code storage unit 52. The "area number" data 62 is used to distinguish individual data sets from one another. As for the "area number" data 62, it is sufficient to use numbers that do not overlap one another. The protection area information is written to the "protection area" data 63, the count of the "protection area" data 63 at the time of registration is written to the "start count" data 64, the protection frequency is written to the "protection frequency" data 65, and the cancellation code is written to the "cancellation code" data 66.

Figure 7A:
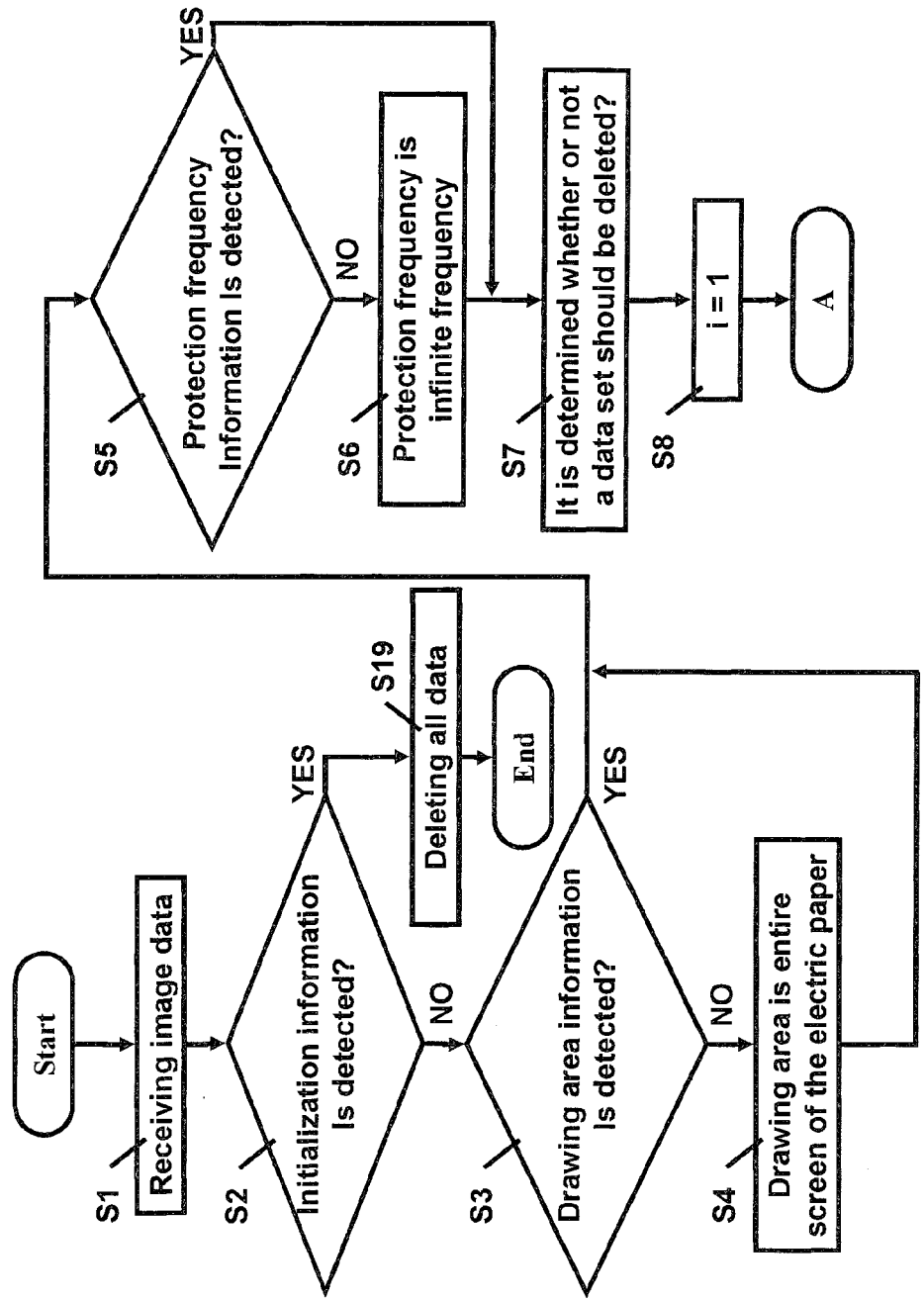
FIGS. 7A and 7B are flowcharts showing process operations to be performed by the electronic paper control circuit.
Figure 7B:
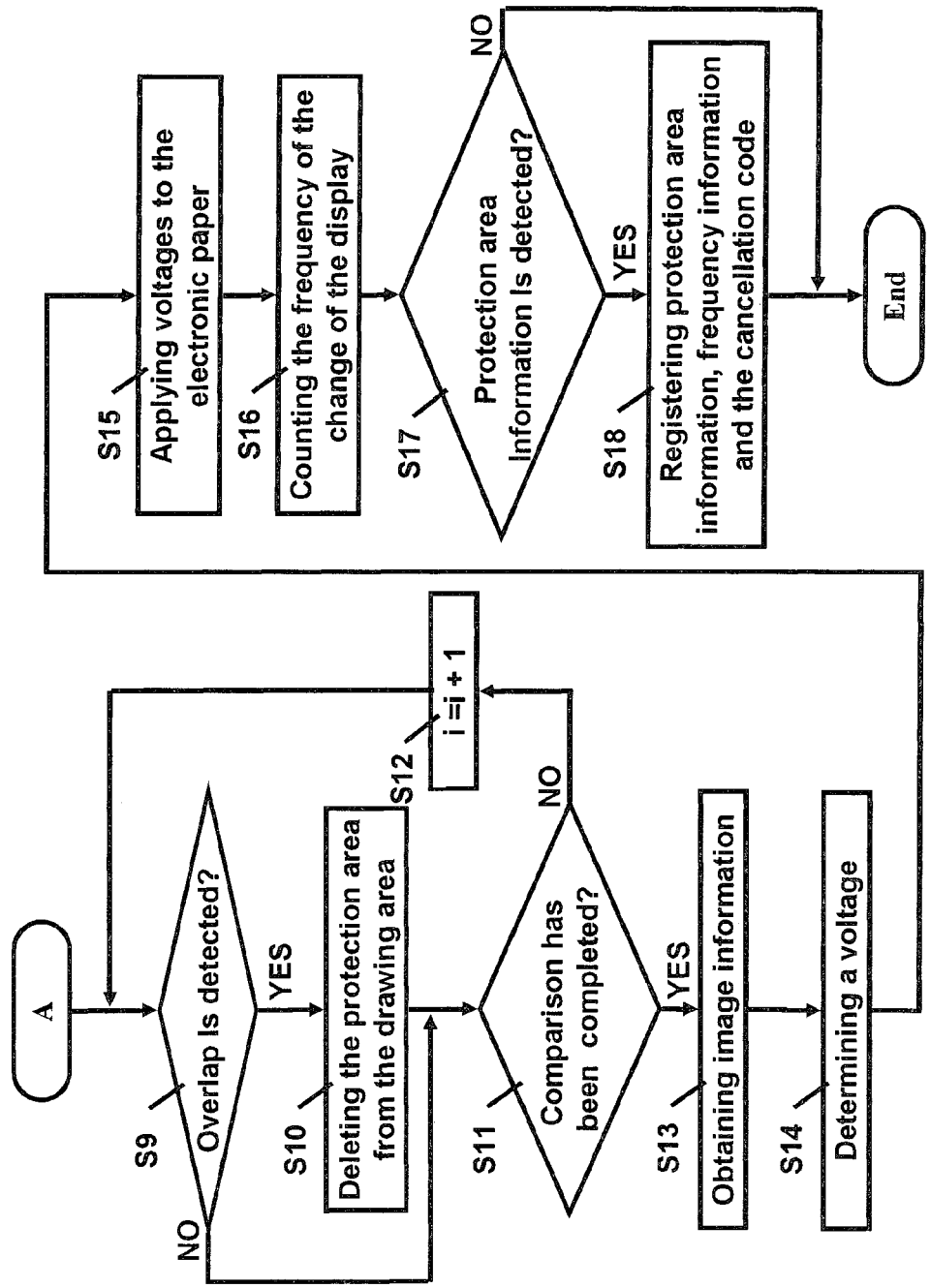

Process operations to be performed by the electronic paper control circuit 26 will now be described. As shown in FIG. 7, if the reception unit 38 receives image data in step S1, the initialization information detection unit 45 attempts to detect initialization information of the image data in step S2. If the initialization information detection unit 45 has not detected such information, the drawing area information detection unit 41 attempts to detect drawing area information in step S3. If the drawing area information detection unit 41 has detected such information, the information is transmitted to the drawing area generation unit 53. If the drawing area information detection unit 41 has not detected such information, it sets up a drawing area over the entire screen of the electronic paper 13. A notification about the drawing area set up in this manner is provided to the drawing area generation unit 53.

The protection frequency information detection unit 42 attempts to detect protection frequency information in step S5. If it has detected such information, the information is transmitted to the frequency storage control unit 48. If the protection frequency information detection unit 42 has not detected such information, it sets up an infinite frequency as the protection frequency in step S6. A notification about the infinite protection frequency set up in this manner is provided to the frequency storage control unit 48.

In subsequent step 7, it is determined whether or not a data set in the non-volatile memory 59 should be deleted. If the data set should be deleted, the area storage control unit 46, the frequency storage control unit 48, and the cancellation code storage control unit 51 delete the data set concerned from the non-volatile memory 59. If not, the electronic paper control circuit proceeds to the next process operation. Process operations in step S7 will be detailed later.

Subsequently, the drawing area generation unit 53 compares the drawing area of the image data with the protection area in the non-volatile memory 59. In doing so, the drawing area generation unit 53 sets "1" for a variable i. In subsequent step 9, the drawing area generation unit 53 acquires the "protection area" data 63 from the first data set in the area information table 61. Then, the drawing area generation unit 53 compares the area on the display screen specified by the protection area information with the drawing area. If an overlap is identified between the drawing area and the protection area, the drawing area generation unit 53 deletes the protection area from the drawing area in step 10. In step 11, the drawing area generation unit 53 determines whether or not a comparison has been made with respect to each of all data sets in the area information table 61. If such comparisons have not been completed, the variable i is replaced with (i+1) in step 12. Steps 9 to 11 are repeated in this way until comparisons with respect to all the data sets are completed. Thus, all the protection areas are deleted from the drawing area. If the drawing area generation unit 53 has not identified an overlap between the drawing area and the protection area included in a data set in step 9, it will ignore such a data set.

Once all the protection areas have been deleted, the voltage calculation unit 54 acquires the image information in step 13. Then, the voltage calculation unit 54 determines a voltage for each of the pixels of the electronic paper 13 in step 14. In doing so, it refers to image information on the drawing area.

In subsequent step S15, the display drive unit 55 applies voltages to the electronic paper 13 according to the result of the calculations performed by the voltage calculation 54. The counting unit 57 counts the frequency of the change of the display each time such voltage application is performed.

The protection area information detection unit 44 attempts to detect protection area information from the image data in step 17. If the protection area information detection unit 44 has detected such information, it instructs the area storage control unit 46, the frequency storage control unit 48, and the cancellation code storage control unit 51 to register the protection area information, the protection frequency information, and the cancellation code, respectively. Thus, the "protection area" data 63, the "protection frequency" data 65, and the "cancellation code" data 66 are set up in the area information table 61 included in the non-volatile memory 59. Simultaneously, the frequency storage control unit 48 writes the count in the counting unit 57 to the "start count" data 64. These pieces of data 63, 64, 65, and 66 are handled as one data set. "Area number" data is assigned to each data set. Thus, the "protection area" data 63 is accumulated in the area information table 61. On the other hand, if the protection area information detection unit 44 has not detected protection area information, the area information table 61 will not be updated. Then, the process operations end.

If the initialization information detection unit 45 has detected initialization information in step 2, it outputs a predetermined notification signal in step 19. Upon receipt of such a notification, the area storage control unit 46, the frequency storage control unit 48, and the cancellation code storage control unit 51 delete all data sets in the non-volatile memory 59. Then, the process operations end.

Figure 8:
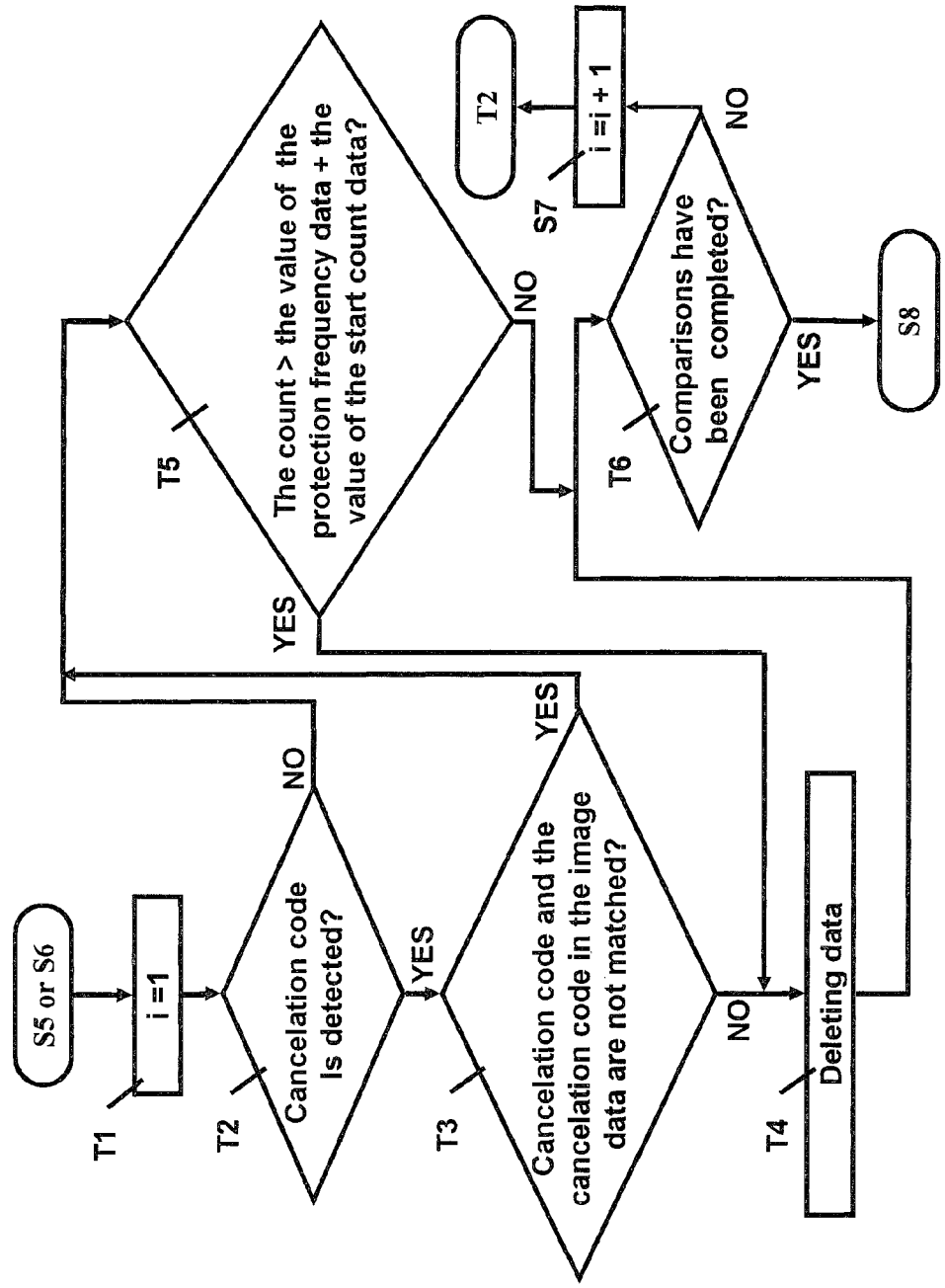
FIG. 8 is a flowchart detailing a "step of examining the need for deleting a data set" shown in FIG. 7A.

The process operations according to step 7 of FIG. 7 will now be detailed. As shown in FIG. 8, "1" is set for the variable i in step T1. In subsequent step T2, the cancellation code detection unit 43 attempts to detect a cancellation code. If the cancellation code detection unit 43 had detected a cancellation code, the cancellation code comparison unit 58 compares the cancellation code in the image data with the "cancellation code" data 66 in the area information table 61 in step T3. If the first "cancellation code" 66 and the cancellation code in the image data are matched, the cancellation code comparison unit 58, in step T4, instructs the area storage control unit 46 to delete the "protection area" data 63 associated with the "cancellation code" concerned. Simultaneously with the deletion of the "protection area" 63, the "start count" data 64, the "protection frequency" data 65, and the "cancellation code" data 66 is deleted from the non-volatile memory 66. Thus, one data set is deleted.

If the cancellation code detection unit 43 has not detected a cancellation code in step T2, the protection frequency comparison unit 56 compares the count in the counting unit 57 with the "protection frequency" data 65. In doing so, the value of the "start cont" data 64 is subtracted from the count in the counting unit 57. Thus, the frequency of the change of the display after the registration of the "protection area" data 63 is identified. If the count in the counting unit 57 exceeds the sum of the value of the "protection frequency" data 65 and the value of the "start count" data 64, the protection frequency comparison unit 56, in step T4, instructs the area storage control unit 46 to delete the "protection area" data 63 associated with the "protection frequency" data 65 concerned. Simultaneously with the deletion of the "protection area" data 63, the "start count" data 64, the "protection frequency" data 65, and the "cancellation code" data 66 is deleted from the non-volatile memory 59. Thus, one data set is deleted.

Likewise, if it has been recognized in step T3 that the first "cancellation code" 66 and the cancellation code in the image data are not matched, the protection frequency comparison unit 56 compares the count in the counting unit 57 with the "protection frequency" data 65. If the count in the counting unit 57 exceeds the sum of the value of the "protection frequency" data 65 and the value of the "start count" data 64, the protection frequency comparison unit 56, in step T4, instructs the area storage control unit 46 to delete the "protection area" data 63 associated with the "protection frequency" data 65 concerned. Simultaneously with the deletion of the "protection frequency" 63, the "start count" data 64, the "protection frequency" data 65, and the "cancellation code" data 66 is deleted from the non-volatile memory 59. Thus, one data set is deleted.

In step T6, it is determined whether or not a comparison has been made with respect to each of all data sets in the area information table 61. If such comparisons have not been completed, the variable i is replaced with (i+i) in step T7. Steps T2 to T5 are repeated in this manner until such comparisons are completed.

While new image data specifies a drawing area, the electronic paper control system 11 as described above maintains the previous image in a specific area. Although the new image data attempts to force the change of the previous image, the electronic paper 12 controls such a change. Additionally, maintaining the previous image does not require that the corresponding image data be stored in a memory. This avoids an increase in capacity of the memory.

In particular, it is expected that the electronic paper control system 11 as described above will be used to manage an advertisement. When the image on the display screen of the electronic paper 13 is changed, a user of the electronic paper 12, who is always viewing the display screen, recognizes an advertisement if the advertisement is shown on the display screen. Visual recognition of the advertisement is counted each time the image is changed. This realizes billing in accordance with the frequency of the visual recognition of the advertisement.

Figure 9:
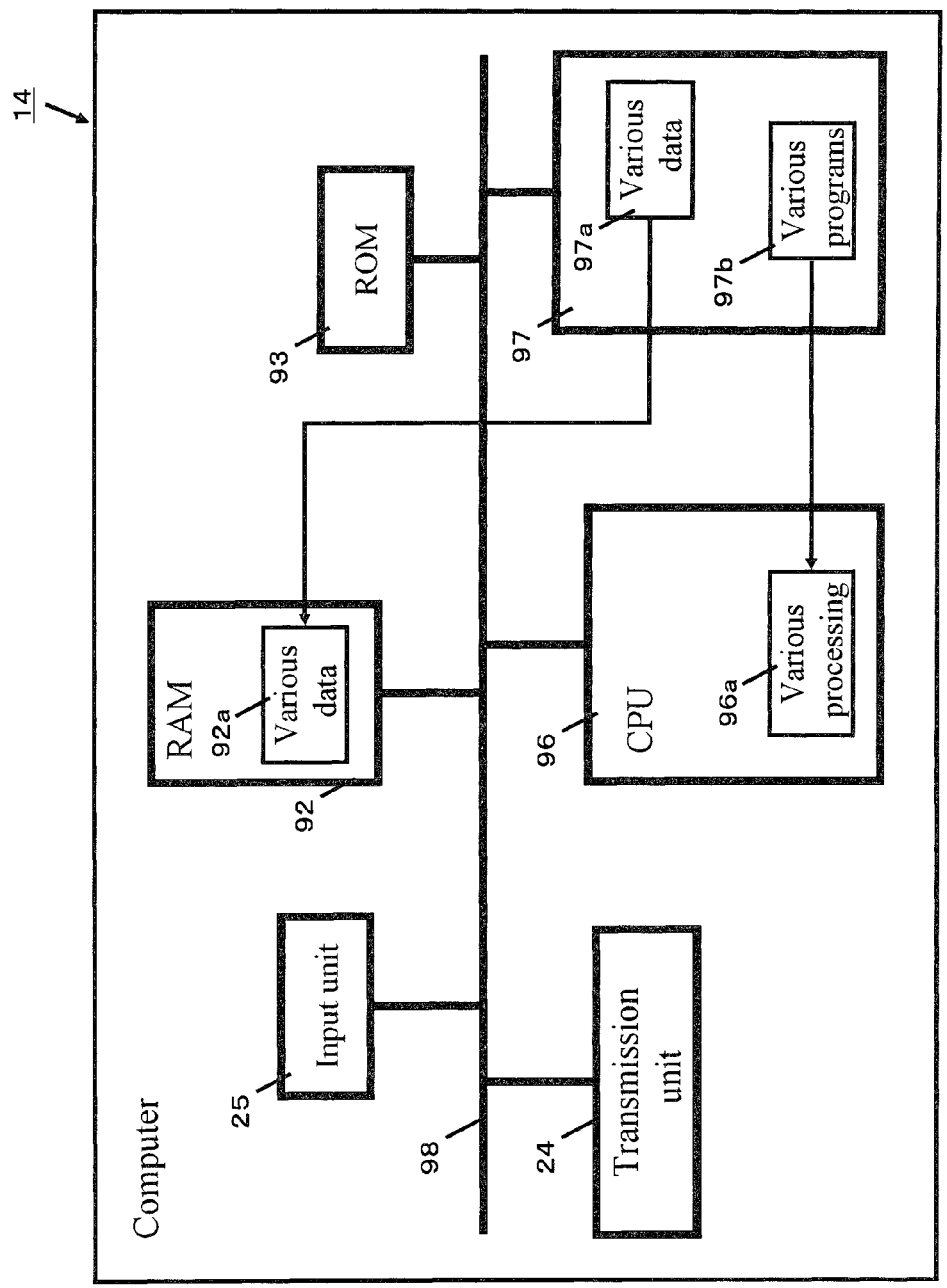
FIG. 9 is a diagram showing the hardware structure of the data generation device shown in FIG. 2.

FIG. 9 is a diagram showing the hardware structure of the data generation device 14 shown in FIG. 2. The computer comprises: the input unit 25; a RAM (Random Access Memory) 92; a ROM (Read Only memory) 93; the transmission unit 24; a CPU (Central Processing Unit) 96 (or MCU (Micro Controller Unit); an MPU (Micro Processing Unit); and an HDD (Hard Disk Drive) 97 that are connected via a bus 98.

Further, when the computer corresponds to the data generation device 14, the HDD 97 stores various data 97a and various programs 97b that exhibit the same functions as those of the generation unit 14. Furthermore, the CPU 96 reads the various programs 97b from the HDD 97 and executes the programs, thereby starting various processing 96a that realizes functions of the functions of the data generation device 14. The various processing 96a corresponds to the image information generation unit 16, the drawing area information generation unit 17, the cancellation code generation unit 18, the protection frequency information generation unit 19, the protection area information generation unit 21, the initialization information generation unit 22 and the image data generation unit 23, as shown in FIG. 2.

What is claimed is:
1. A system comprising:
   an input unit configured to input information to the system;
   a display having a display area configured to display an image corresponding to image data signals applied thereto, the display being capable of maintaining the image to be displayed after termination of application of the image data signals;
   an area designation unit configured to designate a part of the display area on the basis of protection area information inputted from the input device, the part of area being overlapped to the display area; and
   a controller unit configured to receive image data and generating image data signals to be applied to the display, the controller unit being configured to inhibit application of image data signals to the designated part of the display area while applying new image data signals to the display, and to un-designate the designated part of the display area and to allow application of image data signals thereto wherein the controller unit measures a frequency of receiving image data and un-designates the designated part of the display area on the basis of the measured frequency.

2. The system of claim 1, wherein the area designation unit provides information for un-designating the designated part of the display area.

3. The system of claim 2, wherein the controller unit un-designates the designated part of the display area upon receiving the information.

4. An apparatus for controlling a display device to display an image on a display area of the display device, the apparatus comprising:

an area designation unit configured to designate a part of the display area on the basis of protection area information inputted from an input device, the part of area being overlapped to the display area; and a controller unit configured to receive image data and generating image data signals to be applied to the display, the controller unit being configured to inhibit application of image data signals to the designated part of the display area while applying new image data signals to the display, to un-designated the designated part of the display area and allow application of image data signals thereto;

wherein the controller unit measures a frequency of receiving image data and un-designates the designated part of the display area on the basis of the measured frequency.

5. The apparatus of claim 4, wherein the controller unit un designates the designated part of the display area on the basis of the frequency of receiving image data.

6. A method of controlling a display device to display an image on a display area of the display device, the method comprising:

designating a part of the display area on the basis of protection area information, the part of the display area being overlapped to the display area;

receiving image data by a controller;

generating image data signals to be applied to the display; and being configured to inhibit application of image data signals to the designated part of the display area while applying new image data signals to the display, to un-designated the designated part of the display area and allow application of image data signals thereto;

measuring a frequency of receiving image data; and un-designating the designated part of the display area on the basis of the measured frequency.

\* \* \* \* \*